United States Patent [19]

Umbricht

[11] Patent Number: 4,703,411

[45] Date of Patent: Oct. 27, 1987

[54] VOLTAGE CONVERTER WITH GTO THYRISTORS IN SERIES CONNECTION WITH AT LEAST A CHOKE WITH FREEWHEELING CIRCUIT

[75] Inventor: Stefan Umbricht, Wettingen, Switzerland

[73] Assignee: BBC Brown, Boveri & Company, Limited, Baden, Switzerland

[21] Appl. No.: 886,168

[22] Filed: Jul. 16, 1986

[30] Foreign Application Priority Data

Jul. 26, 1985 [CH] Switzerland .................. 3250/85

[51] Int. Cl.$^4$ ............................................ H02H 7/122
[52] U.S. Cl. ...................................... 363/57; 363/96; 307/642
[58] Field of Search ................. 363/57, 58, 68, 71, 363/96, 135, 136, 50, 54; 361/56, 91, 100; 307/252 L, 252 M

[56] References Cited

U.S. PATENT DOCUMENTS

| | | | |
|---|---|---|---|
| 3,832,573 | 8/1974 | Ver Planck et al. | 363/57 X |
| 4,231,083 | 10/1980 | Matsuda et al. | 363/57 X |
| 4,384,248 | 5/1983 | Matsuda et al. | 363/58 X |
| 4,488,214 | 12/1984 | Chambers | 363/96 X |
| 4,535,378 | 8/1985 | Endo | 363/57 X |

Primary Examiner—Patrick R. Salce
Assistant Examiner—Marc S. Hoff
Attorney, Agent, or Firm—Oblon, Fisher, Spivak, McClelland & Maier

[57] ABSTRACT

A voltage converter provided for use in power electronics, particularly as an inverter for generating alternating voltages for vehicle motors. Electric energy is supplied to the converter via direct-voltage connections (2, 3). The desired alternating voltage can be tapped off at an alternating-voltage connection (1). The alternating-voltage connection (1) is connected via at least one of series connected gate turn-off thyristors (Th1, Th2) and via at least one current limiting reactor (L1), which is connected in series with the gate turn-off thyristors to respective of the positive and negative direct-voltage connection (2, 3). Each gate turn-off thyristor is provided with a turn-off relief circuit (5). In parallel with the current limiting reactor, a reactor free-wheeling diode (D1) is connected in series with a reactor free-wheeling resistor (R1) in a free-wheeling branch. To reduce overvoltages during the turning-off of the gate turn-off thyristors, which overvoltages originate from stray inductances in the feed lines, an overvoltage capacitor is connected in parallel with these thyristors via the reactor free-wheeling diode.

10 Claims, 6 Drawing Figures

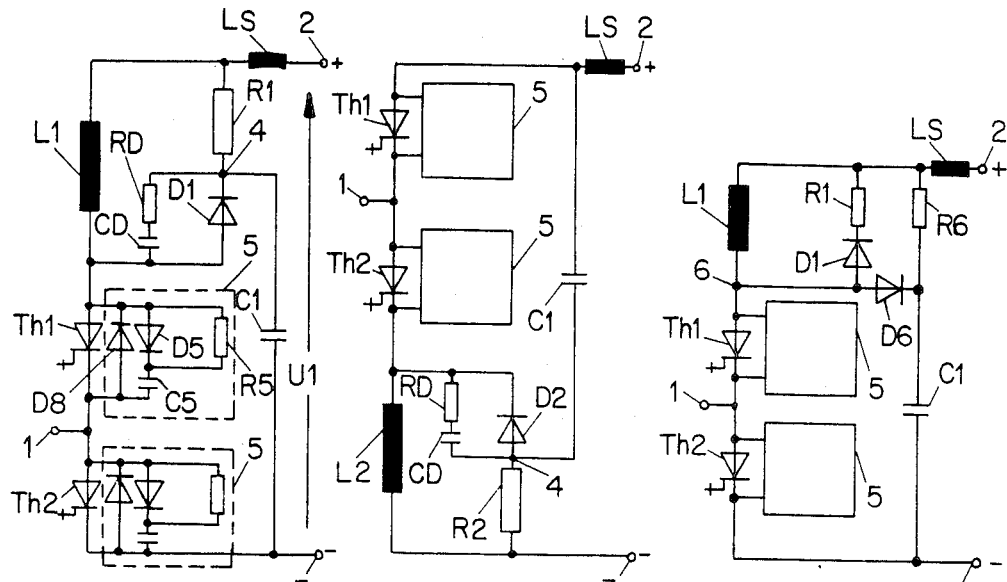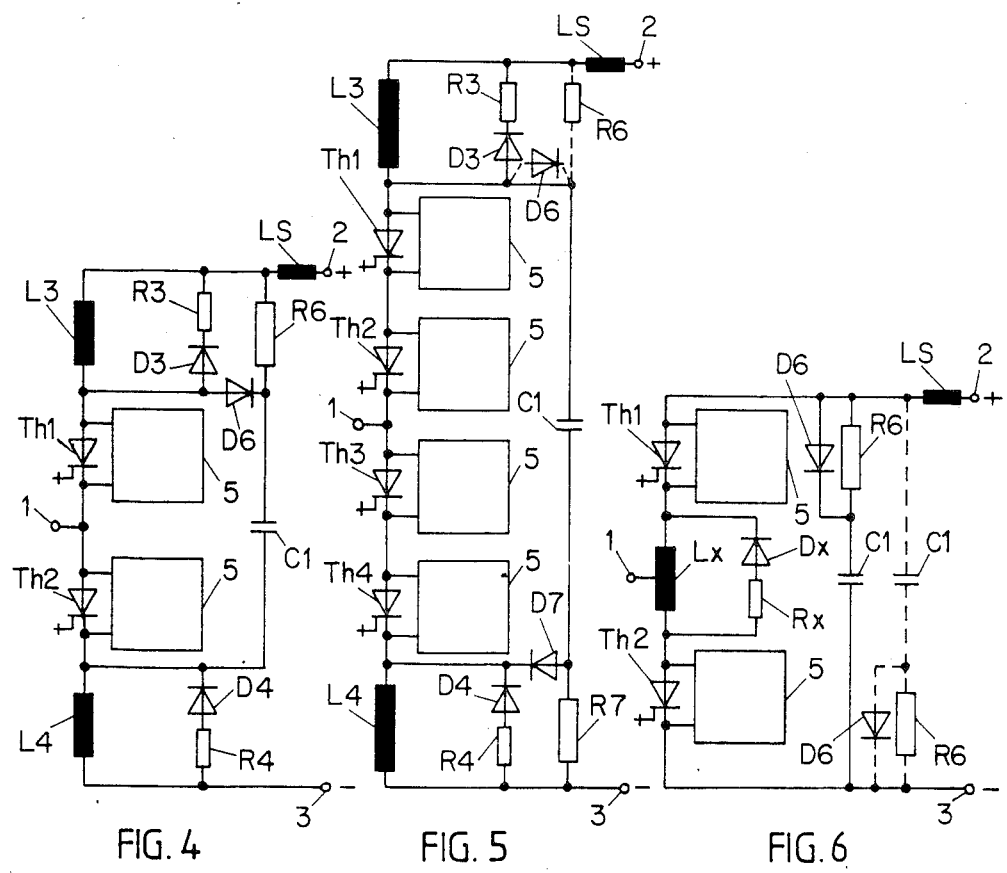

VOLTAGE CONVERTER WITH GTO THYRISTORS IN SERIES CONNECTION WITH AT LEAST A CHOKE WITH FREEWHEELING CIRCUIT

BACKGROUND OF THE INVENTION

1. Field of the Invention

This invention relates to voltage converters as described in the conference report of the International Power Electronic Conference of Mar. 27–31, 1983 in Tokyo, Japan, pages 1587–1598.

2. Discussion of the Background

In the above noted report, a three-phase inverter bridge circuit, the input side of which is supplied with a direct voltage of 1.5 kV by means of current collectors from a contact wire line, is specified for driving induction motors of an electrically operated vehicle. Each bridge branch has two series-connected gate turn-off thyristors, each being designed for a reverse voltage of 2.5 kV and a current of 1.6 kA. Each thyrisor is associated with a turn-off release circuit which is provided with a circuit diode, in series with a circuit capacitor in a parallel circuit to the thyristor. In parallel with this circuit diode, which has the same polarity as the thryistor, a circuit resistor is connected in series with a winding of a feedback transformer. The energy stored in the two circuit capacitors of the two thyristors can be fed back into the direct-voltage system by means of the feedback transformer. In series with the two thyristors, a simple reactor is provided for limiting the current rise, and a saturable reactor, connected in series with it, for reducing instantaneous overvoltages during the switching on of the thyristors. To recover the energy stored in the two reactors, the winding of a second feedback transformer is connected in series with a diode in a parallel branch to the reactors (free-wheeling branch).

The disadvantageous feature of this is that two relatively expensive gate turn-off thyristors must be connected in series for each inverter branch for a direct feed voltage which is low in comparison with the reverse voltage of the thyristors.

SUMMARY OF THE INVENTION

Accordingly, an object of this invention is to provide a novel voltage converter which manages with less expenditure with respect to the gate turn-off thyristors for a given direct voltage.

The above noted object, as well as others, is achieved by providing a new and improved voltage converter including two direct-voltage connections carrying opposite potential, an alternating voltage connection, at least two series-connected gate turn-off thyristors, at least one current limiting reactor in series with the thyristors, a reactor free-wheeling diode provided in a parallel branch to each current limiting reactor, a reactor free-wheeling resistor connected in series with each reactor free-wheeling diode and an overvoltage capacitor which, on the one hand, is effectively connected via the reactor freewheeling resistor to a first direct-voltage connection and on the other hand, to a second direct-voltage connection, carrying an opposite potential, of the voltage converter.

An advantage of the invention lies in the fact that in the case of a direct-feed voltage which is low in comparison with the reverse voltage of the thyristors, such as, for example, in the case of a reverse voltage of 2.5 kV and a direct-feed voltage of 1.5 kV, the number of thyristors needed can be reduced to one half. This is associated with considerable cost saving since the cost of a gate turn-off thyristor is about five to ten-times as high as the costs for the switching elements additionally needed for reducing overvoltages during the switching-on and switching-off of the thyristors. It is relatively difficult to control series circuits of thyristors; the thyristors to be connected in series must have data which are well matched.

Another advantage consists in the fact that gate turn-off thyristors with comparatively lower electric strength can be used with a given direct-feed voltage, which can again result in considerable cost savings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1 and 2 are equivalent circuit diagrams of a voltage converter having only one current limiting reactor in series with two gate turn-off thyristors, an overvoltage capacitor being connected in parallel with the two thyristors via a reactor free-wheeling diode and is connected via a reactor free-wheeling resistor to a direct voltage connection;

FIG. 3 is a current diagram of a voltage converter circuit corresponding to FIG. 1, in which the overvoltage capacitor is connected via an additional capacitor discharge resistor to a direct voltage connection;

FIG. 4 is a circuit diagram of a voltage converter circuit according to FIG. 3, having two end-side current limiting reactors and associated free-wheeling circuits;

FIG. 5 is a circuit diagram of a voltage converter circuit, equivalent to FIG. 4; having four series-connected thyristors, and FIG. 6 is a circuit diagram of a voltage converter circuit comprising a center-tapped current limiting reactor which is connected in series between two thyristors.

DESCRIPTION OF THE PREFERRED EMBODIMENTS

Referring now to the drawings, wherein like reference numerals designate identical or corresponding parts throughout the several views, in FIG. 1, numeral 1 designates an alternating-voltage connection, numeral 2 a direct-voltage connection of positive polarity to a direct-voltage source, not shown, and numeral 3 designates a direct-voltage connection of negative polarity to the same direct-voltage source. A direct voltage U1 of 1.5 kV is used. The alternating voltage connection 1 is connected, on the one hand, in a first static converter branch via a first gate turn-off thyristor Th1, also called a GTO thyristor, and a current limiting reactor L1, connected in series with it and having an inductance of 14 μH, to the positive direct-voltage connection 2 and, on the other hand, in a second static converter branch via a second gate turn-off thyristor Th2 to the negative direct-voltage connection 3. In this arrangement, the alternating-voltage connection 1 is connected to the cathode of the thyristor Th1 and to the anode of thyristor Th2. In the connecting line of the current limiting reactor L1 to the direct-voltage connection 2, a stray inductance LS is inserted, which is not a special component but is conditional upon the line feeds, is about 1 μH and is undesirable per se. Such a stray inductance LS could naturally also be inserted in the feed line from the thyristor Th2 to the direct-voltage connection 3.

A reactor free-wheeling diode D1 is connected in series with a reactor free-wheeling resistor R1 of 0.1Ω in a parallel branch to the current limiting reactor L1. In addition, a diode circuit capacitor CD of 0.2 μF is connected in series with a diode circuit resistor RD of 5Ω in a parallel branch to the reactor free-wheeling diode D1 to prevent undesirable overvoltages across the reactor free-wheeling diode D1.

For each of the two gate turn-off thyristors Th1 and Th2, a thyristor circuit or turn-off relief circuit 5 of equal configuration and values is provided. The turn-off relief circuit 5 has a thyristor free-wheeling diode D8 which is of the opposite polarity as the respective thyristor. In a parallel branch to the thyristor free-wheeling diode D8, a thyristor circuit capacitor C5 of 4 μF is connected in series with a thyristor circuit diode D5. A thyristor circuit resistor R5 of 6 Ω is connected in parallel with the thyristor circuit diode D5. Low-inductance components D8, D5, C5 and R5 are preferably used for the turn-off relief circuit, the components Th1 and Th2, D8, D5 and C5 being disposed coaxially and at a small distance from each other. The thyristor free-wheeling diode D8 can also be integrated into the constructional element of the thyristor. Several low-inductance thyristor circuit diodes D5 and thyristor circuit capacitors C5 are preferably connected in parallel and/or in series with each other (not drawn).

By reducing the stray inductances of thyristor circuit diodes D5, capacitors C5 and line connections of the turn-off relief circuit 5 of a tablet-shaped power thyristor Th1 and Th2, designed for reverse voltages of 2.5 kV and turn-off currents of 1.8 kA, its permissible turn-off current can be increased and its pulse tooth voltage of the firt steep rise of the anode-cathode voltage can be reduced during its turn-off.

A tap or an electric junction 4 between the reactor free-wheeling diode D1 and the reactor free-wheeling resistor R1 is connected via an overvoltage capacitor C1 of 15 μF to the negative direct-voltage connection 3.

FIG. 1 shows a single-phase voltage converter with two static converter branches which can be used, for example, as an inverter. For generating a three-phase alternating voltage, three such voltage converters would have to be provided, which could be connected to the same direct-voltage source at the direct-current side. The alternating voltage could then be tapped off at three separate alternating-voltage connections 1, the thyristors being correspondingly switched with a phase displacement in a manner known per se.

When, for example, the thyristor Th1 is turned off, the current flowing through the current limiting reactor L1 can flow, on the one hand, through the free-wheeling circuit L1, D1, R1 and, on the other hand via D5, R5, C5, 1 through a load, for example a motor (not shown), to be connected at 1.

The current flowing through the stray inductance LS can be removed, on the one hand, via R1, C1, 5, 1 and, on the other hand, via L1, D5, C5, 1 and the load connected there.

There are basically two possibilities for removing the current flowing through the stray inductance LS: 1. thyristors with higher reverse voltage can be used if available or 2. a larger thyristor circuit capacitor C5 can be provided in the turn-off relief circuit 5.

Since the thyristor circuit capacitor C5 is discharged via the thyristor circuit resistor R5 every time the thyristor is switched on, however, it should be as small as possible to avoid energy losses. A solution to this problem is provided here by the overvoltage capacitor C1 which will not discharge completely so that no additional losses are produced.

Another possibility for reducing a switching-off overvoltage $$\Delta U \approx i_{Th}\sqrt{L/C}.$$

consists in reducing the stray inductance LS which can be achieved by low-inductance lines and coaxially arranged low-inductance components. In the formula, $i_{Th}$ is the turn-off current through the thyristor, L is the inductance of LS and C is the capacitance of C5. The overvoltage capacitor C1 is connected as closely as possible and with low inductance to the gate turn-off thyristors Th1 and Th2.

In the circuit according to FIG. 2, a current limiting reactor L2 is provided instead of the current limiting reactor L1 in FIG. 1, which is connected in series between the thyristor Th2 and the negative direct-voltage connection 3. In a parallel branch to the current limiting reactor L2 a reactor free-wheeling diode D2 is again connected in series with a reactor free-wheeling resistor R2 as in the circuit according to FIG. 1. In parallel with D2, a diode circuit capacitor CD is connected in series with a diode circuit resistor RD. The electric junction 4 for the connection of the overvoltage capacitor C1 corresponds to that of FIG. 1, C1 being connected, on the other hand, via LS to the positive direct-voltage connection 2. The action of this circuit is the same as in the circuit according to FIG. 1.

The circuit according to FIG. 3 corresponds to that of FIG. 1, components RD and CD having been omitted for reasons of better clarity. In an additional parallel branch to the current limiting reactor L1, a diode D6 is connected in series with a capacitor discharge resistor R6, C1 being connected, on the one hand, to the junction of D6 and R6 and to the cathode of D6 and, on the other hand to 3. The resistance value of R6 is especially matched to LS and C1.

FIG. 4 shows a voltage converter circuit comprising two current limiting reactors L3 and L4, which are connected to the ends of thyristors Th1 and Th2, with associated free-wheeling branches D3, R3 and D4, R4. The circuit of FIG. 4 only differs from that of FIG. 3 in that the current limiting reactor L4 with free-wheeling branch D4, R4 is additionally provided between Th2 and the negative direct-voltage connection 3 and in that C1 is not connected directly to 3 but to the electric junction of Th2 and L4.

An advantage of this circuit, compared with that of FIGS. 1 to 3, consists in that current limiting reactors and associated circuit elements of smaller values can be used.

The circuit of FIG. 5 differs from that of Figure 4 in that each of the two branches of the voltage converter 2 is provided with series-connected thyristors Th1 and Th2 and Th3 and Th4 with associated turn-off relief circuits, also called snubber circuits, 5. A diode D7 with a capacitor discharge resistor R7 is connected in parallel with the free-wheeling branch D4, R4 of L4. The overvoltage capacitor C1 is connected, on the one hand, to the electric junction of L3 with Th1 and, on the other hand, to the electric junction of D7 and R7, as shown in continuous lines. The components D6 and R6 of FIG. 4 are missing. Alternatively, however, D6 and R4 can be present and can be connected as in FIG. 4, as is indicated with dashed lines in FIG. 5.

In the circuit according to FIG. 6, a current limiting reactor Lx is connected in series between gate turn-off thyristors Th1 and Th2, the anode of Th1 being connected via the stray inductance LS to the positive direct-voltage connection 2 and the cathode of Th2 being connected to the negative direct-voltage connection 3. The current limiting reactor Lx is provided with a parallelconnected free-wheeling branch comprising a reactor freewheeling diode Dx in series with a reactor free-wheeling resistor Rx and a center tap connected to the alternatingvoltage connection 1. Each thyristor Th1 and Th2 is associated with a turn-off relief or snubber circuit 5. The overvoltage capacitor C1 can be connected, on the one hand, via a capacitor discharge resistor R6 and a diode D6 connected in parallel with it to the positive direct-voltage connection 2 and, on the other hand, directly to the negative directvoltage connection 3, as is shown in continuous lines. But the overvoltage capacitor C1 can also be connected, on the one hand, to 2 via LS and, on the other hand, to 3 via R6, D6 again being connected in parallel with R6, as is inindicated in dashed lines.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A voltage converter comprising:
   first and second direct-voltage connections carrying opposite potential, and an alternating voltage connection;
   at least two series-connected gate turn-off thyristors;
   at least one current limiting reactor connected in series with said thyristors between said first and second direct-voltage connections;
   a reactor free-wheeling diode provided in a parallel branch to each current limiting reactor;
   a resistor serving as a reactor free-wheeling resistor connected in series with each reactor freewheeling diode;
   an overvoltage capacitor having a first terminal coupled to a connecting point of the reactor free-wheeling resistor and the reactor free-wheeling diode and a second terminal coupled to the second directvoltage connection.

2. A voltage converter as claimed in claim 1, further comprising:
   a second diode, and a second resistor serving as a capacitor discharge resistor, wherein said first terminal of the overvoltage capacitor is coupled via said second diode to a junction between a current limiting reactor and a first of said at least two series-connected gate turn-off thyristors, and also via said capacitor discharge resistor, which is connected in series with said second diode in parallel to said current limiting reactor, to the first direct-voltage connection.

3. A voltage converter as claimed in claim 2, further comprising:

a second current limiting reactor, connected in series with a second of said gate turn-off thyristors between said second gate turn-off thyristor and said second direct-voltage in connection, wherein said second terminal of the overvoltage capacitor is coupled to a junction between the second current limiting reactor and said second thyristor of said at least two series-connected gate turn-off thyristors; and
a series circuit including a reactor free wheeling diode and a reactor free-wheeling resistor, which is connected in parallel to said second current limiting reactor.

4. A voltage converter as claimed in claim 3, further comprising:
   an additional series circuit comprising a diode and a resistor connected in parallel to said second current limiting reactor, wherein the second terminal of said overvoltage capacitor is connected to a junction between the resistor and the diode of said additional series circuit and is coupled via the diode of said additional series circuit to the junction between said second current limiting reactor and said second gate turn-off thyristor.

5. A voltage converter as claimed in claim 1, further comprising:
   plural snubber circuits which are parallel-connected to respective of said gate turn-off thyristors;
   wherein each snubber circuit comprises,
   a thyristor free-wheeling diode connected in antiparallel relationship with the respective thyristor;
   at least one snubber diode having the same polarity as said gate turn-off thyristor,
   at least one snubber capacitor connected in series with the thyristor circuit diode in parallel with the respective gate turn-off thyrsitor, and
   at least one snubber resistor connected in parallel with the snubber diode,
   the snubber diode and the snubber capacitor having an axial construction element direction which is equal to that of the respective gate turn-off thyristor; and
   the gate turn-off thyristor having low inductance connections to the snubber circuit.

6. A voltage converter as claimed in claim 2, further comprising:
   plural snubber circuits which are parallel-connected to respective of said gate turn-off thyristors;
   wherein each snubber circuit comprises,
   a thyristor free-wheeling diode connected in antiparallel relationship with the respective thyristor;
   at least one snubber diode having the same polarity as said gate turn-off thyristor,
   at least one snubber capacitor connected in series with the thyristor circuit diode in parallel with the respective gate turn-off thyristor, and
   at least one snubber resistor connected in parallel with the snubber diode,
   the snubber diode and the snubber capacitor having an axial constructional element direction which is equal to that of the respective gate turn-off thyristor; and
   the gate turn-off thyristor having low inductance connections to the snubber circuit.

7. A voltage converter as claimed in claim 3, further comprising:
   plural snubber circuits which are parallel-connected to respective of said gate turn-off thyristors;

wherein each snubber circuit comprises,
a thyristor free-wheeling diode connected in antiparallel relationship with the respective thyristor;
at least one snubber diode having the same polarity as said gate turn-off thyristor,
at least one snubber capacitor connected in series with the thyristor circuit diode in parallel with the respective gate turn-off thyristor, and
at least one snubber resistor connected in parallel with the snubber diode,
the snubber diode and the snubber capacitor having an axial constructional element direction which is equal to that of the respective gate turn-off thyristor; and
the gate turn-off thyristor having low inductance connections to the snubber circuit.

8. A voltage converter as claimed in claim 4, further comprising:
plural snubber circuits which are parallelconnected to respective of said gate turn-off thyristors;
wherein each snubber circuit comprises,
a thyristor free-wheeling diode connected in antiparallel relationship with the respective thyristor;
at least one snubber diode having the same polarity as said gate turn-off thyristor,
at least one snubber capacitor connected in series with the thyristor circuit diode in parallel with the respective gate turn-off thyristor, and
at least one snubber resistor connected in parallel with the snubber diode,
the snubber diode and the snubber capacitor having an axial constructional element direction which is equal to that of the respective gate turn-off thyristor; and
the gate turn-off thyristor having low inductance connections to the snubber circuit.

9. A voltage converter comprising:
first and second direct-voltage connections carrying opposite potential, and an alternating voltage connection;
at least two series-connected gate turn-off thyristors;
at least one current limiting reactor connected in series between said at least two gate turn-off thyristors between the first and second direct-voltage connections;
a series circuit comprising a reactor free-wheeling diode and a reactor free-wheeling resistor connected in parallel with said at least one current limiting reactor;
at least one overvoltage capacitor and a capacitor discharge resistor, wherein the overvoltage capacitor has a first terminal connected via the capacitor discharge resistor to the first direct-voltage connection and a second terminal connected to the second direct-voltage connection; and
a diode connected in parallel with the capacitor discharge resistor.

10. A voltage converter as claimed in claim 9, further comprising:
plural snubber circuits which are parallel-connected to respective of said gate turn-off thyristors;
wherein each snubber circuit comprises,
a thyristor free-wheeling diode connected in antiparallel relationship with the respective thyristor;
at least one snubber diode having the same polarity as said gate turn-off thyristor,
at least one snubber capacitor connected in series with the thyristor circuit diode in parallel with the respective gate turn-off thyristor, and
at least one snubber resistor connected in parallel with the snubber diode,
the snubber diode and the snubber capacitor having an axial constructional element direction which is equal to that of the respective gate turn-off thyristor; and
the gate turn-off thyristors having low inductance connections to the snubber circuit.

* * * * *